(12) United States Patent
Panda et al.

(10) Patent No.: US 11,322,156 B2
(45) Date of Patent: May 3, 2022

(54) FEATURES SEARCH AND SELECTION TECHNIQUES FOR SPEAKER AND SPEECH RECOGNITION

(71) Applicant: Tata Consultancy Services Limited, Mumbai (IN)

(72) Inventors: Ashish Panda, Thane (IN); Sunilkumar Kopparapu, Thane (IN); Sonal Sunil Joshi, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 184 days.

(21) Appl. No.: 16/727,784

(22) Filed: Dec. 26, 2019

(65) Prior Publication Data

US 2020/0211568 A1 Jul. 2, 2020

(30) Foreign Application Priority Data

Dec. 28, 2018 (IN) .............................. 201821049730

(51) Int. Cl.
*G10L 17/08* (2013.01)
*G10L 17/02* (2013.01)
(Continued)

(52) U.S. Cl.
CPC ............ *G10L 17/08* (2013.01); *G10L 15/02* (2013.01); *G10L 15/20* (2013.01); *G10L 17/00* (2013.01); *G10L 17/02* (2013.01); *G10L 17/20* (2013.01)

(58) Field of Classification Search
CPC ......... G10L 17/08; G10L 15/02; G10L 17/20; G10L 15/20; G10L 17/00; G10L 17/02
(Continued)

(56) References Cited

U.S. PATENT DOCUMENTS 9,299,347 B1 * 3/2016 Siohan ................... G10L 15/02
10,204,619 B2 * 2/2019 Siohan ................... G10L 15/10
(Continued)

OTHER PUBLICATIONS

Raj, Bhiksha, Michael L. Seltzer, and Richard M. Stern. "Reconstruction of missing features for robust speech recognition." Speech communication 43.4 (2004): 275-296.*
(Continued)

*Primary Examiner* — Edwin S Leland, III
(74) *Attorney, Agent, or Firm* — Finnegan, Henderson, Farabow, Garrett & Dunner, LLP

(57) ABSTRACT

With recent real-world applications of speaker and speech recognition systems, robust features for degraded speech have become a necessity. In general, degraded speech results in poor performance of any speech-based system. This poor performance can be attributed to feature extraction functionality of speech-based system which takes input speech file and converts it into a representation called as a feature. Embodiments of the present disclosure provide systems and methods that compute distance between each degraded speech feature extracted from an input speech signal with each clean speech feature comprised in a memory of the system to obtain set of matched clean speech features wherein at least a subset of cleaned speech features are dynamically selected based on a pre-defined threshold and the computed distance, thereby computing statistics for the dynamically selected clean speech features set for utilizing in at least one of a speech recognition system and a speaker recognition system.

15 Claims, 4 Drawing Sheets

(51) Int. Cl.
*G10L 17/00* (2013.01)
*G10L 17/20* (2013.01)
*G10L 15/02* (2006.01)
*G10L 15/20* (2006.01)

(58) Field of Classification Search
USPC .......................................................... 704/249
See application file for complete search history.

(56) References Cited

U.S. PATENT DOCUMENTS

| | | |
|---|---|---|
| 2003/0061037 A1* | 3/2003 | Droppo ............... G10L 21/0208 |
| | | 704/226 |
| 2008/0208578 A1* | 8/2008 | Geller .................... G10L 15/07 |
| | | 704/243 |
| 2016/0111107 A1* | 4/2016 | Erdogan ................ G10L 25/03 |
| | | 704/226 |
| 2017/0270952 A1* | 9/2017 | Panda ..................... G10L 15/20 |
| 2017/0316790 A1* | 11/2017 | Borgstrom .......... G10L 21/0232 |
| 2017/0323653 A1* | 11/2017 | Hassan al Banna ........................ |
| | | G10L 21/0216 |
| 2018/0068675 A1* | 3/2018 | Variani ................. G10L 19/008 |
| 2018/0174576 A1* | 6/2018 | Soltau .................... G06N 3/084 |
| 2020/0211568 A1* | 7/2020 | Panda ..................... G10L 17/02 |

OTHER PUBLICATIONS

Dev, A. et al. (Nov. 2010). "Robust Features for Noisy Speech Recognition using MFCC Computation from Magnitude Spectrum of Higher Order Autocorrelation Coefficients," *International Journal of Computer Applications*, vol. 10, No. 8; pp. 36-38.

* cited by examiner

FEATURES SEARCH AND SELECTION TECHNIQUES FOR SPEAKER AND SPEECH RECOGNITION

PRIORITY CLAIM

This U.S. patent application claims priority under 35 U.S.C. § 119 to: India Application No. 201821049730, filed on Dec. 28, 2018. The entire contents of the aforementioned application are incorporated herein by reference.

TECHNICAL FIELD

The disclosure herein generally relates to features search and selection techniques, and, more particularly, to features search and selection techniques for speaker and speech recognition.

BACKGROUND

The characteristics of a speaker and speech are represented by feature vectors derived from a speech utterances. With the recent real-world applications of speaker and speech recognition systems, robust features for degraded speech have become a necessity. In general, degraded speech results in poor performance of any speech-based system (e.g., Speech Recognition, Speaker Verification, etc.). This poor performance can be attributed to a feature extraction functionality of the speech-based system which takes an input speech file and converts it into a representation called as a feature. Further, to understand degraded segments of the input speech file, features reconstruction is relied upon human's gained knowledge based on past experience. This may result in generating inaccurate features vector generation and are prone to error while identifying speakers and recognizing speeches.

SUMMARY

Embodiments of the present disclosure present technological improvements as solutions to one or more of the above-mentioned technical problems recognized by the inventors in conventional systems. For example, in one aspect, there is provided a processor implemented method for features search and selection techniques for speaker and speech recognition. The method comprises receiving, an input speech signal pertaining to one or more users; splitting the input speech signal into a plurality of segments and extracting one or more degraded speech features from the plurality of segments; computing a distance between each of the plurality of degraded speech features and a plurality of clean features comprised in a features database to obtain a set of matched clean speech features for each of the plurality of degraded speech features, wherein the step of computing a distance is based on at least a subset of one or more degraded speech features from the plurality of degraded speech features comprised in one or more spectral bins with higher amplitudes pertaining to the input speech signal; dynamically selecting one or more clean speech features from the set of matched clean speech features based on a pre-defined threshold and the computed distance to obtain a selected clean speech features set; and computing statistics for the selected clean speech features set, and utilizing the computed statistics in at least one of a speech recognition system and a speaker recognition system.

In an embodiment, the one or more clean speech features are selected when the computed distance is less than or equal to or greater than the pre-defined threshold.

In an embodiment, wherein the step of computing a distance between each of the plurality of degraded speech features and the plurality of clean speech features to obtain the set of matched clean speech features comprises: dividing the plurality of clean speech features into a plurality of subset of clean speech features; estimating a distance between the plurality of degraded speech features and each subset of clean speech features from the plurality of subset of clean speech features; and identifying at least one closest subset of clean speech features from the plurality of subset of clean speech features that has a minimum distance as the set of matched clean speech features.

In an embodiment, wherein the step of dividing the plurality of clean speech features into a plurality of subset of clean speech features is based on one or more clustering methods.

In an embodiment, wherein the distance comprises one of a Euclidean distance or a Mahalanobis distance.

In another aspect, there is provided a system for features search and selection techniques for speaker and speech recognition. The system comprises a memory storing instructions; one or more communication interfaces; and one or more hardware processors coupled to the memory via the one or more communication interfaces, wherein the one or more hardware processors are configured by the instructions to: receive, an input speech signal pertaining to one or more users; split the input speech signal into a plurality of segments and extracting one or more degraded speech features from the plurality of segments; compute a distance between each of the plurality of degraded speech features and a plurality of clean features comprised in a features database to obtain a set of matched clean speech features for each of the plurality of degraded speech features, wherein the step of computing a distance is based on at least a subset of one or more degraded speech features from the plurality of degraded speech features comprised in one or more spectral bins with higher amplitudes pertaining to the input speech signal; dynamically select one or more clean speech features from the set of matched clean speech features based on a pre-defined threshold and the computed distance to obtain a selected clean speech features set; and compute statistics for the selected clean speech features set, and utilizing the computed statistics in at least one of a speech recognition system and a speaker recognition system.

In an embodiment, the one or more clean speech features are selected when the computed distance is less than or equal to or greater than the pre-defined threshold.

In an embodiment, wherein the step of a distance between each of the plurality of degraded speech features and the plurality of clean speech features is computed to obtain the set of matched clean speech features by: dividing the plurality of clean speech features into a plurality of subset of clean speech features; estimating a distance between the plurality of degraded speech features and each subset of clean speech features from the plurality of subset of clean speech features; and identifying at least one closest subset of clean speech features from the plurality of subset of clean speech features that has a minimum distance as the set of matched clean speech features.

In an embodiment, wherein the step of dividing the plurality of clean speech features into a plurality of subset of clean speech features is based on one or more clustering methods.

In an embodiment, wherein the distance comprises one of a Euclidean distance or a Mahalanobis distance.

In yet another aspect, there are provided one or more non-transitory machine readable information storage mediums comprising one or more instructions which when executed by one or more hardware processors causes a method for features search and selection techniques for speaker and speech recognition. The instruction/method comprises receiving, an input speech signal pertaining to one or more users; splitting the input speech signal into a plurality of segments and extracting one or more degraded speech features from the plurality of segments; computing a distance between each of the plurality of degraded speech features and a plurality of clean features comprised in a features database to obtain a set of matched clean speech features for each of the plurality of degraded speech features, wherein the step of computing a distance is based on at least a subset of one or more degraded speech features from the plurality of degraded speech features comprised in one or more spectral bins with higher amplitudes pertaining to the input speech signal; dynamically selecting one or more clean speech features from the set of matched clean speech features based on a pre-defined threshold and the computed distance to obtain a selected clean speech features set; and computing statistics for the selected clean speech features set, and utilizing the computed statistics in at least one of a speech recognition system and a speaker recognition system.

In an embodiment, the one or more clean speech features are selected when the computed distance is less than or equal to or greater than the pre-defined threshold.

In an embodiment, wherein the step of computing a distance between each of the plurality of degraded speech features and the plurality of clean speech features to obtain the set of matched clean speech features comprises: dividing the plurality of clean speech features into a plurality of subset of clean speech features; estimating a distance between the plurality of degraded speech features and each subset of clean speech features from the plurality of subset of clean speech features; and identifying at least one closest subset of clean speech features from the plurality of subset of clean speech features that has a minimum distance as the set of matched clean speech features.

In an embodiment, wherein the step of dividing the plurality of clean speech features into a plurality of subset of clean speech features is based on one or more clustering methods.

In an embodiment, wherein the distance comprises one of a Euclidean distance or a Mahalanobis distance.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
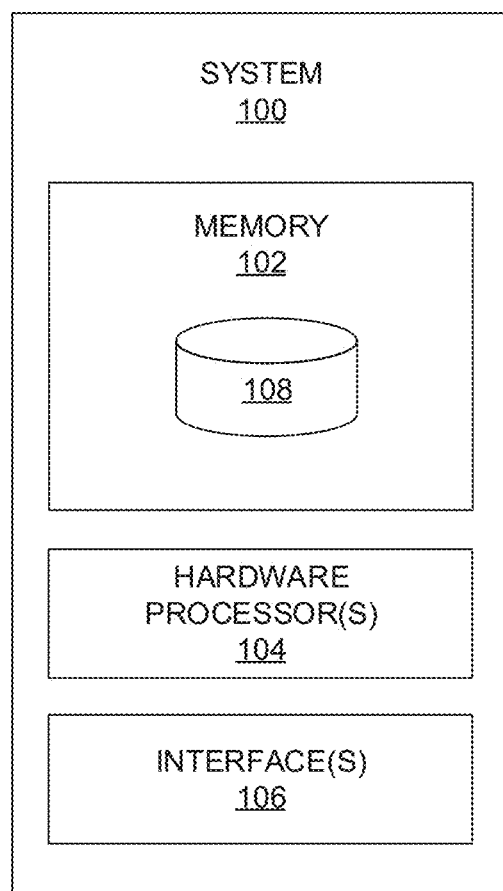
FIG. 1 illustrates an exemplary block diagram of a system implementing techniques for features search and selection for speaker and speech recognition, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 illustrates an exemplary block diagram of a system 100 implementing techniques for features search and selection for speaker and speech recognition, in accordance with an embodiment of the present disclosure. The system 100 may also be referred as 'a features search and selection system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise, but are not limited to various features (e.g., MFCC, and the like), speech signals, information pertaining to users, training data, clean speech features, degraded speech features, distance information pertaining to clean speech features, and degraded speech features, and the like. In an embodiment, the memory 102 may store one or more technique(s) (e.g., distance computing techniques, feature search and selection techniques) which when executed by the one or more hardware processors 104 perform the methodology described herein. The memory 102 may further comprise information pertaining to input(s)/output(s) of each step performed by the systems and methods of the present disclosure.

Figure 2:
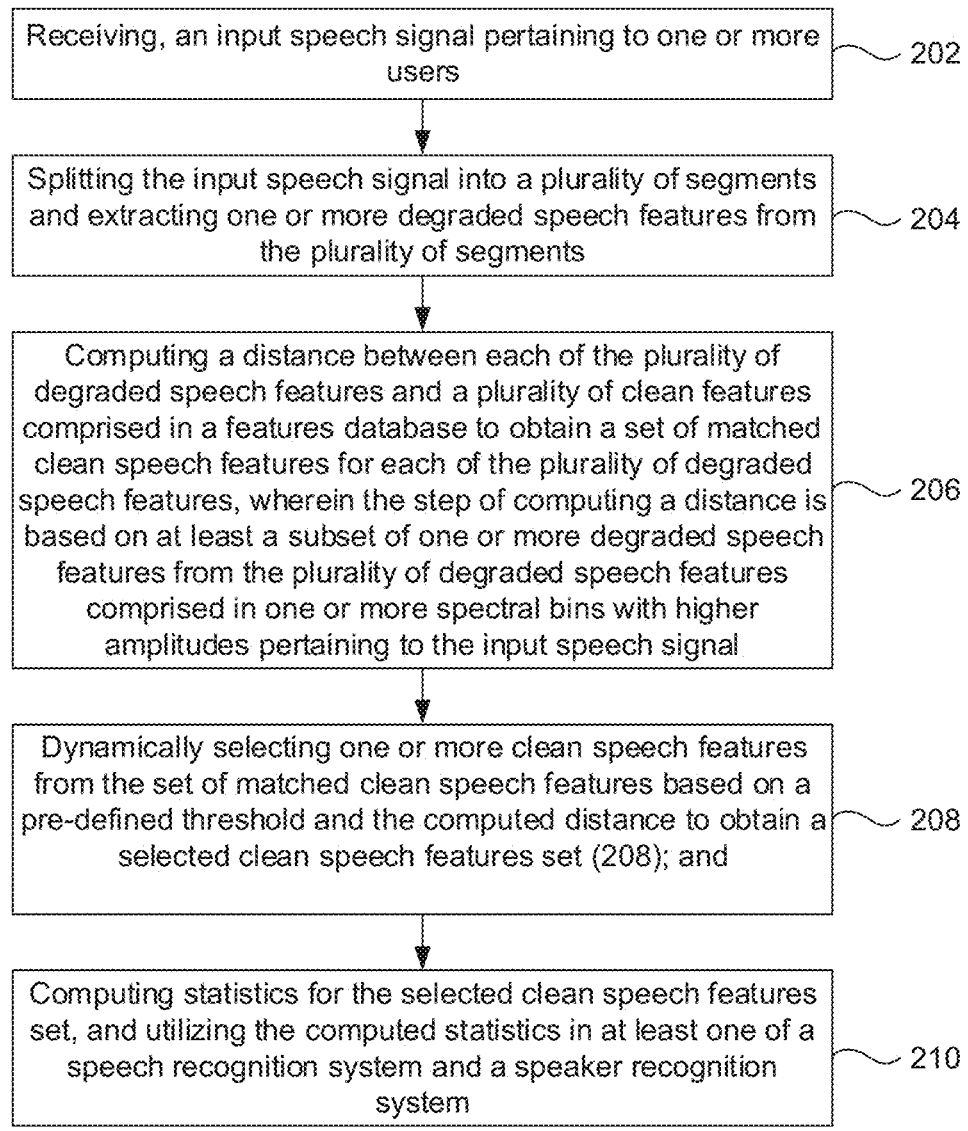
FIG. 2 illustrates an exemplary flow diagram of a method for features search and selection for recognizing speaker and speech from input speech signals using the system of FIG. 1 in accordance with an embodiment of the present disclosure.

FIG. 2, with reference to FIG. 1, illustrates an exemplary flow diagram of a method for features search and selection for recognizing speaker and speech from input speech signals using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2.

Figure 3:
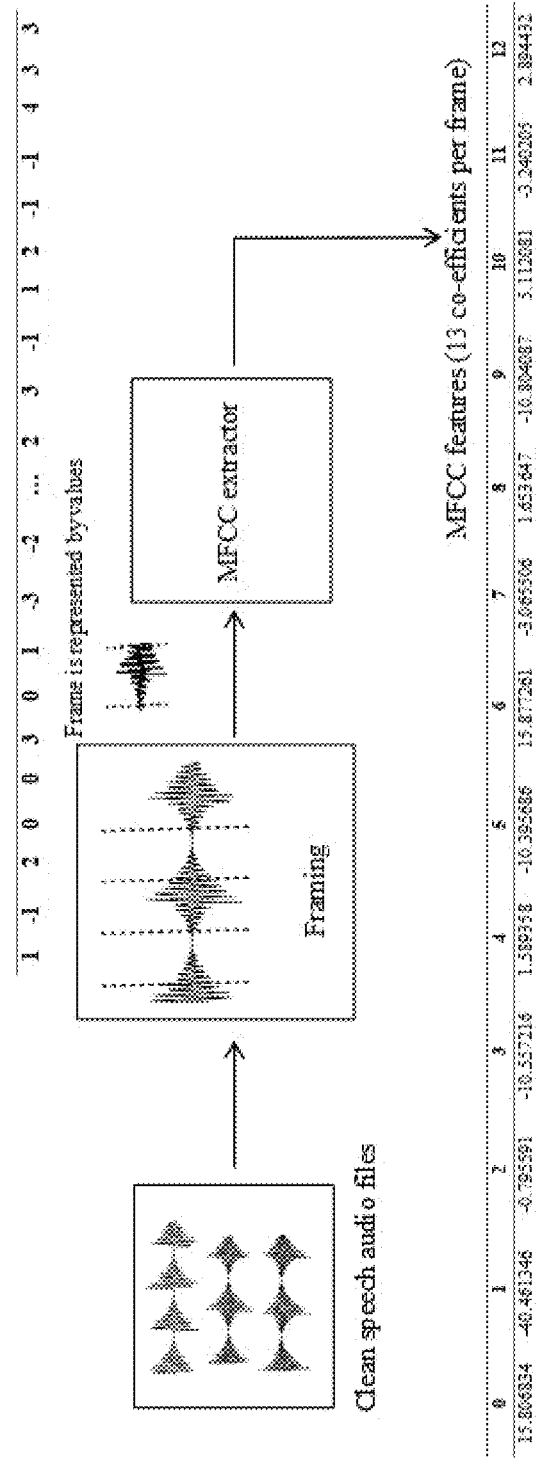
FIG. 3 illustrates an implementation of the system of FIG. 1 for clean speech feature extraction per frame of an input clean signal to generate a clean speech features pool in accordance with some embodiments of the present disclosure.

Prior to receiving or auto retrieving the input speech signal for processing for further analysis, clean speech file or clean speech signal(s) is/are processed wherein each frame from the clean speech signal is represented by values (e.g., as depicted in FIG. 3) and from each of these frames clean speech features are extracted and stored in the memory 102. In an example embodiment, the clean speech features comprise Mel-frequency cepstral coefficients (MFCC) features and these features shall not be construed as limiting the scope of the present disclosure. FIG. 3 further depicts the MFCC clean features per frame (e.g., 13 co-efficient per frame), in one example embodiment of the present disclosure. More specifically, FIG. 3 illustrates an implementation of the system of FIG. 1 for clean speech feature extraction per frame of an input clean signal to generate a clean speech features pool in accordance with some embodiments of the present disclosure. Below Table 1 depicts MFCC clean features illustrated by way of examples and shall not be construed as limiting the scope of the present disclosure.

TABLE 1

| 10 | 9 | 8 | 7 | 6 | 5 |
|---|---|---|---|---|---|
| 15.688371 | 13.304338 | 13.616688 | 12.798914 | 13.243381 | 13.974485 |
| −41.81173 | 14.305588 | 12.912487 | 7.959054 | 17.801499 | −12.78935 |
| −4.232063 | 0.52913 | −21.71162 | −6.773214 | −18.29954 | −0.356622 |
| −14.386919 | −17.262171 | −28.21726 | −19.33002 | −27.09065 | 21.078663 |
| −1.065257 | −45.191406 | −26.38831 | −27.25393 | 7.429053 | −28.71808 |
| −10.460337 | −16.091291 | −10.178019 | −5.993649 | −6.857441 | −18.913382 |
| 18.942496 | 21.694663 | 0.990045 | −9.547091 | −39.499190 | −16.118606 |
| −5.241793 | −11.508706 | 2.061017 | −26.934829 | −9.091571 | −8.118917 |
| 2.725362 | −4.756691 | −14.801131 | −4.849648 | 17.685762 | −19.275982 |
| −10.677100 | −5.999575 | −2.512635 | 5.999591 | −4.515982 | −2.383134 |
| 0.610759 | −0.345004 | 27.010051 | 20.547316 | 25.195668 | 4.867952 |
| −7.186687 | 1.410217 | −13.538360 | −10.084335 | −15.977367 | −4.167949 |
| −0.003948 | 21.884202 | 3.260019 | 0.835136 | 5.907959 | 13.114681 |

| | | | | Co-eff →<br>Frame |
| | 4 | 3 | 2 | 1 | index |
|---|---|---|---|---|---|
| | 13.942879 | 7.604695 | 7.121417 | 15.806834 | 0 |
| | −14.14632 | −17.05113 | −31.1315 | −40.4613 | 1 |
| | −9.50737 | −16.33909 | 1.894330 | −0.795591 | 2 |
| | 14.782754 | −27.06218 | 5.777461 | 10.557216 | 3 |
| | −18.43481 | −9.256704 | 7.382545 | 1.589358 | 4 |
| | −14.880784 | −11.595640 | 3.762758 | −10.395686 | 5 |
| | −8.744597 | −2.574533 | 7.980003 | 15.877261 | 6 |
| | −2.587978 | 7.299664 | 0.197322 | −3.065506 | 7 |
| | −24.710545 | 11.472213 | 0.160371 | 1.653647 | 8 |
| | −22.955886 | 4.965308 | −1.423739 | −10.804087 | 9 |
| | −9.784595 | 1.147746 | 2.535992 | 5.112081 | 10 |
| | −6.687877 | −3.263979 | −0.965160 | −3.240205 | 11 |
| | 16.312023 | 11.664883 | −0.557125 | 2.894432 | 12 |

In the above Table 1, each row represents MFCC clean speech feature of one clean frame. It is to be noted that the number of columns is 13 (0 to 12) as it represents 13 MFCC co-efficients per frame.

In an embodiment of the present disclosure, at step 202, the one or more hardware processors 104 receive an input speech signal (e.g., noisy/degraded speech signal) pertaining to one or more users. In one example embodiment, the input speech signal may be comprised in the database of the memory 102, wherein the system 100 may auto retrieve the input speech signal for further processing and analysis (e.g., features search and selection).

Figure 4:
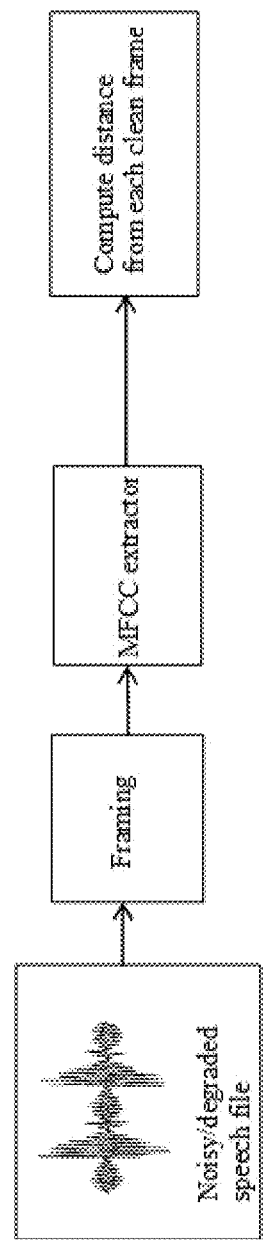
FIG. 4 depicts an exemplary noisy/degraded speech signal with degraded speech features extracted (MFCC features extracted) for distance computation to obtain set of matched clean speech features and dynamic selection of at least a subset thereof, in accordance with an embodiment of the present disclosure.

In an embodiment of the present disclosure, at step 204, the one or more hardware processors 104 split the input speech signal into a plurality of segments and extracting a plurality of degraded speech features from the plurality of segments. In an embodiment, the process for input speech signal (e.g., a noisy speech signal) remains similar as compared to the clean speech signal as described above. In other words, the noisy speech signal is split into a plurality of segments wherein the noisy speech signal is processed frame by frame and the plurality of degraded speech features are extracted from the plurality of segments. FIG. 4, with reference to FIGS. 1 through 3, depicts an exemplary noisy/degraded speech signal with degraded speech features extracted (MFCC features extracted), in accordance with an embodiment of the present disclosure. FIG. 4 depicts degraded MFCC speech features extracted from each frame of the noisy speech signal. More specifically, FIG. 4 depicts an exemplary noisy/degraded speech signal with degraded speech features extracted (MFCC features extracted) for distance computation to obtain set of matched clean speech features and dynamic selection of at least a subset thereof, in accordance with an embodiment of the present disclosure. Below Table 2 depicts extracted degraded MFCC speech features and these features shall not be construed to be limiting the scope of the present disclosure:

TABLE 2

| 0 | 1 | 2 | 3 | 4 | 5 | 6 |
|---|---|---|---|---|---|---|
| 12.405914 | 4.71218 | −3.628792 | −9.371261 | −12.18583 | −9.236907 | −4.414509 |

| 7 | 8 | 9 | 10 | 11 | 12 |
|---|---|---|---|---|---|
| −6.959625 | −9.08999 | −9.272149 | −13.321233 | −3.671134 | 0.584352 |

In an embodiment of the present disclosure, at step 206, the one or more hardware processors 104 compute a distance between each of the plurality of degraded speech features and a plurality of clean features comprised in a features database to obtain a set of matched clean speech features for each of the plurality of degraded speech features. The distance comprises one of a Euclidean distance or a Mahalanobis distance, in one example embodiment. Below Table 3 depicts 10 distance values from each clean frame illustrated by way of example:

TABLE 3

| 1 | 2 | 3 | 4 | 5 |
|---|---|---|---|---|
| 56.059663 | 50.199915 | 46.366598 | 42.249137 | 48.901308 |

| 6 | 7 | 8 | 9 | 10 |
|---|---|---|---|---|
| 68.774519 | 47.140477 | 53.592322 | 51.852104 | 56.769415 |

In the present disclosure, each degraded feature is sequentially compared with all the clean speech features comprised in the database of the memory 102 to compute the above distance depicted in Table 3. Mean of the closest top 'k' clean features is considered for comparison with the degraded feature, in one example embodiment of the present disclosure. Instead of the mean of the closest top 'k' features, any other statistic (median) derived from the closest top k features can also be taken, in another example embodiment. Rather than comparing features one-one, a set of features may be compared, in yet another example embodiment. Further, the distance computation between two features may be done only over a specified set of dimensions, rather than the entire feature vector. For example, spectral bins with higher amplitudes are less susceptible to noise. Therefore, comparing distance between the clean and noisy (or degraded) features only for spectral bins with higher amplitude results in better comparison. In other words, the step of computing a distance and comparison thereof is based on at least a subset of one or more degraded speech features from the plurality of degraded speech features comprised in one or more spectral bins with higher amplitudes pertaining to the input speech signal (see below Table 13). Therefore, the present disclosure not only utilizes or relies on lower amplitude signal features, but also uses degraded speech features comprised in one or more spectral bins with higher amplitudes.

In an embodiment, the step of computing a distance between each of the plurality of degraded speech features $D=\{\vec{D}_1, \vec{D}_2, \ldots, \vec{D}_m\}$, and the plurality of clean speech features $C=\{\vec{C}_1, \vec{C}_2, \ldots, \vec{C}_n\}$, to obtain the set of matched clean speech features comprises: dividing the plurality of clean speech features into a plurality of subset of clean speech features; estimating a distance between the plurality of degraded speech features and each subset of clean speech features from the plurality of subset of clean speech features; and identifying at least one closest subset of clean speech features from the plurality of subset of clean speech features that has a minimum distance as the set of matched clean speech features. In performing above steps, the distance computation is processed faster than traditional methods. In an embodiment, the step of dividing the plurality of clean speech features into a plurality of subset of clean speech features is based on one or more clustering methods to make distance computation faster and efficient. In other words, to make to distance computation step faster, the clean feature data set, say $C=\{\vec{C}_1, \vec{C}_2, \ldots, \vec{C}_n\}$, can be divided into several smaller subsets, say $\vec{C}_1$ by clustering methods, e.g., K-Means algorithm, and the like. Each subset can be represented by a centroid vector, which can be the mean vector for the subset. First, the closest subset is identified by finding the minimum distance between the noisy feature vector and the centroids and then the closest clean feature vector is found by finding the minimum distance between the noisy features.

The above description may be better understood by way of following example, and shall not be construed as limiting the scope of the present disclosure. In the above clean speech feature dataset, each $\vec{c}_\iota$ is a ndim dimensional feature vector of a clean speech frame; mathematically, $$\vec{c}_\iota = [x_1, x_2, \ldots, x_{ndim}]$$

$$\vec{D} = [d_1, d_2, \ldots, d_m]$$

where each $\vec{d}_j \forall 1 \leq j \leq m$, is a ndim dimensional feature vector of a degraded speech frame; mathematically $$\vec{d}_j = [y_1, y_2, \ldots, y_{ndim}]$$

Taking one such degraded frame-level feature ($\vec{d}_j$, where $j \in 1 \leq j \leq m$), the question remains: Is there a feature $\vec{c}_i$ in the clean pool (C) of n that is better representation of the degraded feature $\vec{d}_j$?. In order to find a better representation of the degraded speech feature $\vec{d}_j$, the degraded speech feature $\vec{d}_j$ is compared with all n clean speech features $\vec{c}_i$ from the clean pool as described in step 206.

The distance ($\Delta$; where $\Delta = \{\delta_1, \delta_2, \ldots, \delta_b\}$) is computed between $\vec{d}_j$ and $\vec{c}_i$ using one of the Euclidean distance or the Mahalanobis distance computation methods. For instance, in the present disclosure, the distance is computed using Euclidean distance computation as expressed below by way of example:

$$\delta_i = (x_1 - y_1)^2 + (x_1 - y_1)^2 + \ldots + (x_{ndim} - y_{ndim})^2$$

Let $\delta_\alpha$, $\delta_\beta$ and $\delta_\gamma$ be the smallest 3 elements of the set $\Delta$. Let the corresponding clean frames be $c_\alpha$, $c_\beta$ and $c_\gamma$ respectively.

The mean of the closest k frames is the better representation of the degraded frame $d_j$, which is expressed mathematically by way example below:

$$\text{clean } d_j = \text{mean}(c_\alpha, c_\beta, c_\gamma)$$

In the above expression, only 3 frames are considered and this shall not be construed as limiting the scope of the present disclosure. In other words, instead of 3 frames, any other number can be taken. Further instead of taking the mean of the closest k frames, any other statistic, for example median may be considered.

Further, for the sake of brevity, lowest 4 distance values were considered from Table 3. Below Table 4 depicts the lowest 4 distance values illustrated by way of example:

TABLE 4

| 4 | 3 | 7 | 5 |
|---|---|---|---|
| 42.249137 | 46.366598 | 47.140477 | 48.901308 |

By doing so, the corresponding matched set of clean speech features are obtained as described in step 206. Below Table 5 depicts the corresponding matched set of clean speech features obtained from Table 1 and are illustrated by way of example:

Upon obtaining the set of matched clean speech features in step 206, in an embodiment of the present disclosure, at step 208, the one or more hardware processors 104 dynamically select one or more clean speech features from the set of matched clean speech features based on a pre-defined threshold and the computed distance to obtain a selected clean speech features set. In an embodiment, the one or more clean speech features are dynamically selected when the distance is less than or equal to or greater than the pre-defined threshold. In other words, few of the clean speech features may be discarded that are highly spurious frames by setting a threshold on the minimum distance between the clean speech feature and the noisy (or degraded speech feature). For example, a frame can be discarded if $\{\Delta\} \geq \theta$. In one embodiment, assuming that the pre-defined threshold is 49.0. In such scenarios all the above 4 clean speech features from the set of matched clean speech features from Table 5 are dynamically selected and the remaining are discarded.

In an embodiment of the present disclosure, at step 210, the one or more hardware processors 104 compute statistics for the selected clean speech features set, wherein the computed statistics gets utilized in at least one of a speech recognition system and a speaker recognition system. In an embodiment, computing statistics comprises computing mean/average of the dynamically selected clean speech features set. Below Table 6 depicts mean of the matched set of clean speech features obtained from Table 5 and are illustrated by way of example:

TABLE 5

| Row | 0 | 1 | 2 | 3 | 4 |
|---|---|---|---|---|---|
| 4 | 13.942679 | −14.146325 | −9.507637 | 14.782754 | −18.434813 |
| 3 | 7.604695 | −17.051134 | −16.339088 | −27.062175 | −9.256704 |
| 7 | 12.798914 | 7.959054 | −6.773214 | −19.330027 | −27.253934 |
| 5 | 13.974485 | −12.789348 | −0.356622 | 21.078663 | −28.718080 |

| | 5 | 6 | 7 | 8 | 9 |
|---|---|---|---|---|---|
| 4 | −14.880784 | −8.744597 | −2.587978 | −24.710545 | −22.955886 |
| 3 | −11.595640 | −2.574533 | 7.299664 | 11.472213 | 4.965308 |
| 7 | −5.993649 | −9.547091 | −26.934829 | −4.849648 | 5.999591 |
| 5 | −18.913382 | −16.118606 | −8.118917 | −19.275982 | −2.383134 |

| | 10 | 11 | 12 |
|---|---|---|---|
| 4 | −9.784595 | −6.687877 | 16.312023 |
| 3 | 1.147746 | −3.263979 | 11.664583 |
| 7 | 20.547316 | −10.084335 | 0.835136 |
| 5 | 4.867952 | −1.867952 | 13.114681 |

TABLE 6

| 0 | 1 | 2 | 3 | 4 | 5 | 6 |
|---|---|---|---|---|---|---|
| 12.08019 | −9.00694 | −8.24414 | −2.6327 | −20.9159 | −12.8459 | −9.24621 |

| 7 | 8 | 9 | 10 | 11 | 12 |
|---|---|---|---|---|---|
| −7.58552 | −9.34099 | −3.59353 | 4.194605 | −5.47604 | 10.48161 |

The above values of the clean speech features set depicted in Table 6 is/may be further processed for utilization in at least one of the speech recognition system and the speaker recognition system for recognizing speech and speaker respectively. In the above example, the one or more clean speech features are dynamically selected when the computed distance is less than or equal to the pre-defined threshold. In case the pre-defined threshold is set of 46, then only rows 4 and 3 from Table 5 are dynamically selected by the system 100 to compute statistics (e.g., mean/average or median) utilization in at least one of the speech recognition system and the speaker recognition system for recognizing speech and speaker respectively.

In alternative implementations, the system 100 may dynamically select one or more clean speech features when the distance value is greater than the pre-defined threshold. Therefore, assuming that the pre-defined threshold is >46.0, MFCC features may be extracted as depicted in FIG. 3. Below Table 7 depicts degraded MFCC speech features illustrated by way of example:

TABLE 7

| 0 | 1 | 2 | 3 | 4 | 5 | 6 |
|---|---|---|---|---|---|---|
| 12.405914 | 4.71218 | −3.628792 | −9.371261 | −12.18583 | −9.236907 | −4.414509 |

| 7 | 8 | 9 | 10 | 11 | 12 |
|---|---|---|---|---|---|
| −6.959625 | −9.08999 | −9.272149 | −13.321233 | −3.671134 | 0.584352 |

Based on the above degraded MFCC speech features, distance is computed in comparison to each clean feature of Table 1. Below Table 8 depicts 10 distance values illustrated by way of example:

TABLE 8

| 1 | 2 | 3 | 4 | 5 |
|---|---|---|---|---|
| 56.059663 | 50.199915 | 46.366598 | 42.249137 | 48.901308 |

| 6 | 7 | 8 | 9 | 10 |
|---|---|---|---|---|
| 68.774519 | 47.140477 | 53.592322 | 51.852104 | 56.769415 |

As described above, 4 distance values have been considered that are lowest, in one example embodiment of the present disclosure. In this case entry 4, 3, 7 and 5 and are depicted in below Table 9 by way of illustrative examples:

TABLE 9

| 4 | 3 | 7 | 5 |
|---|---|---|---|
| 42.249137 | 46.366598 | 47.140477 | 48.901308 |

As the pre-defined threshold is now considered to be >46.0, only entry 3, 7 and 5 are shortlisted and depicted in Table 10:

TABLE 10

| 3 | 7 | 5 |
|---|---|---|
| 46.366598 | 47.140477 | 48.901308 |

Based on distance values depicted in Table 10, corresponding values of clean speech features from the Table 1 are dynamically selected. Below Table 11 depicts corresponding matched set of clean speech features are dynamically selected by the system 100:

TABLE 11

| Row | 0 | 1 | 2 | 3 | 4 |
|---|---|---|---|---|---|
| 3 | 7.604695 | −17.051134 | −16.339088 | −27.062175 | −9.256704 |
| 7 | 12.798914 | 7.959054 | −6.773214 | −19.330027 | −27.253934 |
| 5 | 13.974485 | −12.789348 | −0.356622 | 21.078663 | −28.718080 |

TABLE 11-continued

|   | 5 | 6 | 7 | 8 |
|---|---|---|---|---|
| 3 | −11.595640 | −2.574533 | 7.299664 | 11.472213 |
| 7 | −5.993649 | −9.547091 | −26.934829 | −4.849648 |
| 5 | −18.913382 | −16.118606 | −8.118917 | −19.275982 |

|   | 9 | 10 | 11 | 12 |
|---|---|---|---|---|
| 3 | 4.965308 | 1.147746 | −3.263979 | 11.664583 |
| 7 | 5.999591 | 20.547316 | −10.084335 | 0.835136 |
| 5 | −2.383134 | 4.867952 | −1.867952 | 13.114681 |

Using the co-efficient values/clean speech features associated with each row 3, 7 and 5, from Table 11 are dynamically selected by the system 100 to compute statistics (e.g., mean/average or median). Below Table 12 depicts mean of the matched set of clean speech features obtained from Table 11 and are illustrated by way of example:

TABLE 12

| 0 | 1 | 2 | 3 | 4 | 5 | 6 |
|---|---|---|---|---|---|---|
| 11.45936 | −7.29381 | −7.82297 | −8.43785 | −21.7429 | −12.1676 | −9.41341 |

| 7 | 8 | 9 | 10 | 11 | 12 |
|---|---|---|---|---|---|
| −9.25136 | −4.21781 | 2.86059 | 8.85434 | −5.07209 | 8.53813 |

The above values of the clean speech features set depicted in Table 12 is/may be further processed for utilization in at least one of the speech recognition system and the speaker recognition system for recognizing speech and speaker respectively.

Furthermore, as mentioned above, below is an example of degraded MFCC speech features in Table 13 wherein only the, spectral bins with higher amplitudes are considered.

TABLE 13

| 0 | 1 | 2 | 3 | 4 | 5 | 6 |
|---|---|---|---|---|---|---|
| 12.405914 | 4.71218 | −3.628792 | −9.371261 | −12.18583 | −9.236907 | −4.414509 |

| 7 | 8 | 9 | 10 | 11 | 12 |
|---|---|---|---|---|---|
| −6.959625 | −9.08999 | −9.272149 | −13.321233 | −3.671134 | 0.584352 |

As can be seen in the above Table 13, entries 4, 0 and 10 are the spectral bins with higher amplitudes of −12.18583, 12.405914 and −13.321233 respectively. The equivalent clean speech features are taken from the clean speech features pool for distance computation. Below Table 14 depicts equivalent clean speech features set based on the entries 4, 0 and 10 which indicate the spectral bins with higher amplitudes of −12.18583, 12.405914 and −13.321233 respectively.

TABLE 14

| Row | Clean Co-efficient/ speech feature for row 4 from table 13 | Clean Co-efficient/ speech feature for row 0 from table 13 | Clean Co-efficient/ speech feature for row 10 from table 13 |
|---|---|---|---|
| 1 | −62.199942 | 15.151867 | 17.825135 |
| 2 | −16.330114 | 13.942096 | −10.195007 |
| 3 | −11.308995 | 9.936940 | −13.890325 |
| 4 | −17.646404 | 13.262529 | 18.014735 |
| 5 | −19.232152 | 14.679502 | 5.626415 |
| 6 | −40.481836 | 15.766454 | 17.797548 |
| 7 | −55.120618 | 13.926153 | 26.605038 |
| 8 | −36.573713 | 13.384507 | 31.670923 |
| 9 | −17.069736 | 14.384950 | −4.168125 |
| 10 | −17.069736 | 13.544232 | 31.082421 |

Based on the degraded MFCC speech features of Table 13 and clean MFCC speech features of Table 14, the distance is computed for each of the degraded feature based on each clean speech feature wherein the distance values are depicted in below Table 15 by way of illustrative examples:

TABLE 15

| 1 | 2 | 3 | 4 | 5 |
|---|---|---|---|---|
| 58.985361 | 5.415428 | 2.680411 | 31.820106 | 20.34367 |
| 6 | 7 | 8 | 9 | 10 |
| 42.262662 | 58.651578 | 51.187208 | 10.562693 | 44.555037 |

As described above, 4 lowest distance value are selected/chosen which in this are depicted in below Table 16:

TABLE 16

| 3 | 2 | 9 | 5 |
|---|---|---|---|
| 2.680411 | 5.415428 | 10.562693 | 20.34367 |

Based on the above Table 16, and the pre-defined threshold, corresponding matched set of clean speech features are dynamically selected for computing statistics (e.g., average) and are depicted in below Table 17 by way of illustrative example:

TABLE 17

| 0 | 1 | 2 | 3 | 4 | 5 | 6 |
|---|---|---|---|---|---|---|
| 12.405914 | 4.71218 | −3.62879 | −9.37125 | −12.1856 | −9.23691 | −4.41451 |
| 7 | 8 | 9 | 10 | 11 | 12 | |
| −6.959625 | −9.08999 | −9.272149 | −13.32123 | −3.67113 | 0.584352 | |

The values from the above Table 17 correspond to clean speech features equivalent to degraded input frame of the input speech signal and may be further processed and/or utilized in at least one of the speech recognition system and the speaker recognition system for recognizing speech and speaker respectively.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    receiving, an input speech signal pertaining to one or more users;
    splitting the input speech signal into a plurality of segments and extracting one or more degraded speech features from the plurality of segments;
    computing a distance between each of the plurality of degraded speech features and a plurality of clean features comprised in a features database to obtain a set of matched clean speech features for each of the plurality of degraded speech features, wherein the step of computing a distance is based on at least a subset of one or more degraded speech features from the plurality of degraded speech features comprised in one or more spectral bins having amplitudes above a pre-defined threshold pertaining to the input speech signal;
    dynamically selecting one or more clean speech features from the set of matched clean speech features based on a pre-defined threshold and the computed distance to obtain a selected clean speech features set; and
    computing statistics for the dynamically selected clean speech features set, and utilizing the computed statistics in at least one of a speech recognition system and a speaker recognition system.

2. The processor implemented method of claim 1, wherein the one or more clean speech features are selected when the computed distance is less than or equal to or greater than the pre-defined threshold.

3. The processor implemented method of claim 1, wherein the step of computing a distance between each of the plurality of degraded speech features and the plurality of clean speech features to obtain the set of matched clean speech features comprises:
    dividing the plurality of clean speech features into a plurality of subset of clean speech features;
    estimating a distance between the plurality of degraded speech features and each subset of clean speech features from the plurality of subset of clean speech features; and identifying at least one closest subset of clean speech features from the plurality of subset of clean speech features that has a minimum distance as the set of matched clean speech features.

4. The processor implemented method of claim 3, wherein the step of dividing the plurality of clean speech features into a plurality of subset of clean speech features is based on one or more clustering methods.

5. The processor implemented method of claim 1, wherein the distance comprises one of a Euclidean distance or a Mahalanobis distance.

6. A system, comprising:
a memory storing instructions;
one or more communication interfaces; and
one or more hardware processors coupled to the memory via the one or more communication interfaces, wherein the one or more hardware processors are configured by the instructions to:
receive, an input speech signal pertaining to one or more users;
split the input speech signal into a plurality of segments and extracting one or more degraded speech features from the plurality of segments;
compute a distance between each of the plurality of degraded speech features and a plurality of clean features comprised in a features database to obtain a set of matched clean speech features for each of the plurality of degraded speech features, wherein the step of computing a distance is based on at least a subset of one or more degraded speech features from the plurality of degraded speech features comprised in one or more spectral bins having amplitudes above a pre-defined threshold pertaining to the input speech signal;
dynamically select one or more clean speech features from the set of matched clean speech features based on a pre-defined threshold and the computed distance to obtain a selected clean speech features set; and
compute statistics for the dynamically selected clean speech features set, and utilizing the computed statistics in at least one of a speech recognition system and a speaker recognition system.

7. The system of claim 6, wherein the one or more clean speech features are selected when the computed distance is less than or equal to or greater than the pre-defined threshold.

8. The system of claim 6, wherein the distance between each of the plurality of degraded speech features and the plurality of clean speech features is computed to obtain the set of matched clean speech features by:
dividing the plurality of clean speech features into a plurality of subset of clean speech features;
estimating a distance between the plurality of degraded speech features and each subset of clean speech features from the plurality of subset of clean speech features; and
identifying at least one closest subset of clean speech features from the plurality of subset of clean speech features that has a minimum distance as the set of matched clean speech features.

9. The system of claim 8, wherein the step of dividing the plurality of clean speech features into a plurality of subset of clean speech features is based on one or more clustering methods.

10. The system of claim 6, wherein the distance comprises one of a Euclidean distance or a Mahalanobis distance.

11. One or more non-transitory machine readable information storage mediums comprising one or more instructions which when executed by one or more hardware processors causes:
receiving via the one or more hardware processors, an input speech signal pertaining to one or more users;
splitting the input speech signal into a plurality of segments and extracting one or more degraded speech features from the plurality of segments;
computing a distance between each of the plurality of degraded speech features and a plurality of clean features comprised in a features database to obtain a set of matched clean speech features for each of the plurality of degraded speech features, wherein the step of computing a distance is based on at least a subset of one or more degraded speech features from the plurality of degraded speech features comprised in one or more spectral bins having amplitudes above a predefined threshold pertaining to the input speech signal;
dynamically selecting one or more clean speech features from the set of matched clean speech features based on a pre-defined threshold and the computed distance to obtain a selected clean speech features set; and
computing statistics for the selected clean speech features set, and utilizing the computed statistics in at least one of a speech recognition system and a speaker recognition system.

12. The one or more non-transitory machine readable information storage mediums of claim 11, the one or more clean speech features are selected when the computed distance is less than or equal to or greater than the pre-defined threshold.

13. The one or more non-transitory machine readable information storage mediums of claim 11, wherein the step of computing a distance between each of the plurality of degraded speech features and the plurality of clean speech features to obtain the set of matched clean speech features comprises:
dividing the plurality of clean speech features into a plurality of subset of clean speech features;
estimating a distance between the plurality of degraded speech features and each subset of clean speech features from the plurality of subset of clean speech features; and
identifying at least one closest subset of clean speech features from the plurality of subset of clean speech features that has a minimum distance as the set of matched clean speech features.

14. The one or more non-transitory machine readable information storage mediums of claim 13, wherein the step of dividing the plurality of clean speech features into a plurality of subset of clean speech features is based on one or more clustering methods.

15. The one or more non-transitory machine readable information storage mediums of claim 11, wherein the distance comprises one of a Euclidean distance or a Mahalanobis distance.

* * * * *